(12) United States Patent
Hsu et al.

(10) Patent No.: US 11,502,435 B2
(45) Date of Patent: Nov. 15, 2022

(54) SIM CARD CONNECTOR

(71) Applicant: Cheng Uei Precision Industry Co., LTD., New Taipei (TW)

(72) Inventors: Li-Nien Hsu, New Taipei (TW); Sheng-Nan Yu, New Taipei (TW); Chun-Fu Lin, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 68 days.

(21) Appl. No.: 17/327,664

(22) Filed: May 21, 2021

(65) Prior Publication Data

US 2022/0006216 A1    Jan. 6, 2022

(30) Foreign Application Priority Data

Jul. 3, 2020   (TW) .................................. 109208472

(51) Int. Cl.
*H01R 13/24* (2006.01)
*H01R 12/71* (2011.01)
*H04B 1/3816* (2015.01)
*G06K 7/00* (2006.01)

(52) U.S. Cl.
CPC ........... *H01R 12/714* (2013.01); *H01R 13/24* (2013.01); *H04B 1/3816* (2013.01); *G06K 7/0021* (2013.01); *H01R 2201/16* (2013.01)

(58) Field of Classification Search
CPC .. H01R 12/714; H01R 13/24; H01R 2201/16; H01R 12/716; H01R 12/57; H01R 13/2407; H01R 13/41; H04B 1/3816; G06K 7/0021; G06K 7/0026
See application file for complete search history.

(56) References Cited

U.S. PATENT DOCUMENTS

| | | | | |
|---|---|---|---|---|
| 6,086,424 A * | 7/2000 | Chang | ..................... | H01R 12/57 439/630 |
| 7,329,146 B2 * | 2/2008 | Yang | .................. | H01R 12/7029 439/570 |
| 7,387,541 B1 * | 6/2008 | Lai | ........................ | H01R 12/716 439/660 |
| 7,654,868 B1 * | 2/2010 | Wang | .................. | H01R 13/2442 439/862 |
| 8,070,498 B2 * | 12/2011 | Shen | .................... | H01R 12/714 439/862 |

(Continued)

*Primary Examiner* — Abdullah A Riyami
*Assistant Examiner* — Nelson R. Burgos-Guntin
(74) *Attorney, Agent, or Firm* — Cheng-Ju Chiang

(57) ABSTRACT

A SIM card connector includes an insulating body, a plurality of first terminals and a plurality of second terminals. The insulating body has a plurality of first slots and a plurality of second slots. Each side wall of each first slot has a limiting slot. The plurality of the first terminals are inserted into the plurality of the first slots. Each first terminal has a first base portion, a first soldering portion connected with a lower end of the first base portion, and a first contacting portion connected with an upper end of the first base portion. The plurality of the second terminals are inserted into the plurality of the second slots. Each second terminal has a second contacting portion slantwise extended towards a rear end of the insulating body and exposed beyond a top surface of the insulating body.

14 Claims, 6 Drawing Sheets

(56) References Cited

U.S. PATENT DOCUMENTS

| | | | | |
|---|---|---|---|---|
| 8,292,638 | B1* | 10/2012 | Wu | H01R 12/57 439/627 |
| 8,465,326 | B1* | 6/2013 | Xie | G06K 7/0082 439/607.33 |
| 8,974,257 | B1* | 3/2015 | Xie | H01R 13/2442 439/862 |
| 10,791,643 | B1* | 9/2020 | Lin | H05K 5/0256 |
| 11,088,484 | B2* | 8/2021 | Kurita | H01R 13/24 |
| 2005/0054242 | A1* | 3/2005 | Hsieh | H01R 13/2442 439/660 |
| 2007/0224890 | A1* | 9/2007 | Chien | H01R 12/707 439/862 |
| 2008/0171459 | A1* | 7/2008 | Long | G06K 7/003 439/259 |
| 2009/0023343 | A1* | 1/2009 | Chang | H01R 13/2442 439/626 |
| 2012/0295481 | A1* | 11/2012 | Zhang | G06K 7/0034 439/607.22 |
| 2013/0078866 | A1* | 3/2013 | Su | H01R 12/57 439/660 |
| 2014/0335737 | A1* | 11/2014 | Xie | H01R 13/05 439/660 |
| 2015/0207284 | A1* | 7/2015 | Liu | H01R 12/714 439/218 |
| 2016/0118733 | A1* | 4/2016 | Tanaka | G06K 7/04 439/629 |
| 2017/0093057 | A1* | 3/2017 | Wang | G06K 7/0021 |
| 2017/0098902 | A1* | 4/2017 | Wagatsuma | H01R 12/7005 |
| 2017/0125932 | A1* | 5/2017 | Wei | G06K 7/0021 |
| 2017/0162962 | A1* | 6/2017 | Tan | H01R 13/2407 |
| 2017/0250481 | A1* | 8/2017 | Zhu | H01R 25/00 |
| 2018/0131116 | A1* | 5/2018 | Mancias | H01R 12/714 |
| 2018/0175551 | A1* | 6/2018 | Yamachika | H01R 13/635 |
| 2018/0316377 | A1* | 11/2018 | Yang | G06K 13/0812 |
| 2018/0358726 | A1* | 12/2018 | Hur | H01R 13/24 |
| 2019/0272453 | A1* | 9/2019 | Argyres | H01R 13/24 |
| 2021/0034825 | A1* | 2/2021 | Nakamura | G06K 7/0073 |
| 2022/0006216 | A1* | 1/2022 | Hsu | H04B 1/3816 |
| 2022/0029368 | A1* | 1/2022 | Zhang | G06K 19/07743 |
| 2022/0140510 | A1* | 5/2022 | Motohashi | G06K 7/0073 439/367 |

* cited by examiner

SIM CARD CONNECTOR

CROSS-REFERENCE TO RELATED APPLICATION

The present application is based on, and claims priority from, Taiwan Patent Application No. 109208472, filed Jul. 3, 2020, the disclosure of which is hereby incorporated by reference herein in its entirety.

BACKGROUND OF THE INVENTION

1. Field of the Invention

The present invention generally relates to a SIM card connector, and more particularly to a SIM card connector including a terminal structure.

2. The Related Art

With the development of smart phones, demands for SIM (Subscriber Identity Model) card connectors are gradually increased. The SIM card connectors are upgraded on account of cell phones being upgraded. In order to increase more memory space and a battery capacity of the cell phone, and make a main board of the cell phone with more dense arrangements release a space of the cell phone, miniature SIM card connectors have been made to beneficial for manufacturing smaller and lighter cell phones, so that the SIM card connectors have become a target to be achieved by an enterprise.

Referring to FIG. 5 and FIG. 6, a conventional SIM card connector 100' includes an insulating body 10', a front row of first terminals 20' and a rear row of second terminals 30'. Structures of the front row of the first terminals 20' and the rear row of the second terminals 30' of the conventional SIM card connector 100' are the same. Base portions of the front row of the first terminals 20' and the rear row of the second terminals 30' are inserted into the insulating body 10' in opposite directions and are designed longer, consequently, a volume of the conventional SIM card connector 100' is larger. Each first terminal 20' has a first elastic contact piece 24', and each second terminal 30' has a second elastic contact piece 34'. The first elastic contact pieces 24' of the first terminals 20' and the second elastic contact pieces 34' of the second terminals 30' are disposed in the opposite directions. Moreover, due to an extending direction of the second elastic contact piece 34' of each second terminal 30' is the same as an inserting direction of a SIM card being inserted into the conventional SIM card connector 100', the first elastic contact pieces 24' of the first terminals 20' are apt to contact with soldering areas 22' of the first terminals 20' at the time of the first terminals 20' being pressed by the SIM card to cause a phenomenon of the first terminals 20' being stuck.

Therefore, it is especially necessary and important to provide an innovative SIM card connector which effectively prevents a phenomenon of a terminal structure of the innovative SIM card connector being stuck and is able to shorten sizes of base portions of the terminal structure assembled in terminal slots of the innovative SIM card connector.

SUMMARY OF THE INVENTION

An object of the present invention is to provide a SIM card connector. The SIM card connector includes an insulating body, a plurality of first terminals and a plurality of second terminals. The insulating body has a plurality of first slots arranged at a front end of the insulating body and connected to an external space, and a plurality of second slots arranged at a rear end of the insulating body and connected to the external space. The plurality of the first slots are arranged in a front row, and the plurality of the second slots are arranged in a rear row and located behind the plurality of the first slots. Each side wall of each first slot has a limiting slot. The limiting slots of two side walls of each first slot are recessed oppositely. The limiting slots of the two side walls of each first slot are symmetrical. The plurality of the first terminals are inserted into the plurality of the first slots from the front end of the insulating body. The plurality of the first terminals are arranged in a front row. Each first terminal has a first base portion arranged in one first slot, a first soldering portion connected with a lower end of the first base portion, and a first contacting portion connected with an upper end of the first base portion. The first contacting portion of each first terminal slantwise extends towards the rear end of the insulating body from the upper end of the first base portion of each first terminal and is exposed beyond a top surface of the insulating body. The first soldering portion of each first terminal is exposed to a bottom surface of the insulating body. The first base portion of each first terminal has a first resilient portion which is bent to be U-shaped, a fastening portion connected with the first soldering portion and one end of the first resilient portion, and a buffering portion connected with the other end of the first resilient portion. The buffering portion is adjacent to the first contacting portion. The buffering portion is arranged parallel to and above the fastening portion by the first resilient portion. Each side of the buffering portion extends outward to form a flank. The flanks of two sides of the buffering portion are aligned and symmetrical. The flanks of the two sides of the buffering portion are close to the first resilient portion and are cooperated to be assembled between spaces of the limiting slots of the two side walls of the one first slot to buffer a stress force of the first contacting portion of each first terminal. The plurality of the second terminals are inserted into the plurality of the second slots from the rear end of the insulating body and arranged in a rear row. The plurality of the second terminals are located behind the plurality of the first terminals. Each second terminal has a second contacting portion slantwise extended towards the rear end of the insulating body and exposed beyond the top surface of the insulating body. A tilted extension direction of the first contacting portion of each first terminal is the same as a tilted extension direction of the second contacting portion of each second terminal.

Another object of the present invention is to provide a SIM card connector. The SIM card connector includes an insulating body, a plurality of first terminals and a plurality of second terminals. The insulating body has a front surface, a rear surface opposite to the front surface, a top surface connected between tops of the front surface and the rear surface, and a bottom surface opposite to the top surface and connected to bottoms of the front surface and the rear surface. The plurality of the first terminals are positioned in the insulating body. Each first terminal has a first curved portion positioned in the insulating body, a first soldering portion connected with a lower end of the first curved portion and extended outside of the insulating body from a first junction position which is connected between the front surface and the bottom surface of the insulating body, a second curved portion connected with an upper end of the first curved portion, and a first contacting portion slantwise extended towards a rear end of the insulating body from an upper end of the second curved portion and exposed outside from a second junction position which is connected between the front surface and the top surface of the insulating body. The first contacting portion of each first terminal is exposed beyond the top surface of the insulating body. The plurality of the second terminals are positioned in the insulating body. The plurality of the second terminals are located behind the plurality of the first terminals. Each second terminal has a third curved portion positioned in the insulating body, a second contacting portion connected with an upper end of the third curved portion, and a second soldering portion connected with a lower end of the third curved portion and extended outside of the insulating body from a third junction position which is connected between the rear surface and the bottom surface of the insulating body. The second contacting portion of each second terminal is slantwise extended towards the rear end of the insulating body and is exposed beyond the top surface of the insulating body. When a pressure is exerted upon the plurality of the first terminals and the second terminals, a stress of the second curved portion of each first terminal is more than a stress of the third curved portion of each second terminal, the stress of the third curved portion of each second terminal is more than a stress of the first curved portion of each first terminal.

Another object of the present invention is to provide a SIM card connector. The SIM card connector includes an insulating body, a plurality of first terminals and a plurality of second terminals. The insulating body has a plurality of first slots arranged at a front end of the insulating body, and a plurality of second slots arranged at a rear end of the insulating body. The plurality of the second slots are located behind the plurality of the first slots. Middles of two inner surfaces of two side walls of each first slot are recessed oppositely to form two limiting slots. Lower portions of the two inner surfaces of the two side walls of each first slot are recessed oppositely to form two buckling slots. The plurality of the first terminals are inserted into the plurality of the first slots from the front end of the insulating body. The plurality of the first terminals are arranged in a front row. Each first terminal has a first base portion arranged in one first slot, a first soldering portion connected with a lower end of the first base portion, and a first contacting portion connected with an upper end of the first base portion. The first contacting portion of each first terminal slantwise extends towards the rear end of the insulating body from the upper end of the first base portion of each first terminal and is exposed beyond a top surface of the insulating body. The first soldering portion of each first terminal is exposed to a bottom surface of the insulating body. The first base portion of each first terminal has a first resilient portion which is bent to be U-shaped, a fastening portion connected with the first soldering portion and one end of the first resilient portion, a buffering portion connected with the other end of the first resilient portion, and a second resilient portion arranged between and connected between the first contacting portion and the buffering portion. The second resilient portion and the first resilient portion are bent in opposite directions. The buffering portion is adjacent to the first contacting portion. The buffering portion is arranged parallel to and above the fastening portion by the first resilient portion. Two opposite side surfaces of the buffering portion of each first terminal adjacent to two side walls of the one first slot protrude oppositely to form two flanks. The two flanks of each first terminal are assembled in the two limiting slots of one first slot. Top surfaces and bottom surfaces of the two flanks are without abutting against top walls and bottom walls of the two limiting slots to make each flank limited between a top wall and a bottom wall of one limiting slot to move upward and downward. The plurality of the second terminals are inserted into the plurality of the second slots from the rear end of the insulating body and arranged in a rear row. The plurality of the second terminals are located behind the plurality of the first terminals. Each second terminal has a second contacting portion slantwise extended towards the rear end of the insulating body and exposed beyond the top surface of the insulating body.

As described above, the two flanks of each first terminal are cooperated with and assembled in the two limiting slots of the one first slot, and the two interfering teeth of each first terminal are buckled in the two buckling slots of the one first slot, the two interfering teeth of each first terminal abut against the top walls and the bottom walls of the two buckling slots of the one first slot to make the plurality of the first terminals stably inserted into and assembled to the plurality of the first slots to form an interference cooperation between the plurality of the first terminals and the plurality of the first slots, so that the plurality of the first terminals are hardly loosened from the plurality of the first slots of the insulating body. As a result, the SIM card connector effectively prevents a phenomenon of a terminal structure of the SIM card connector which include the plurality of the first terminals and second terminals being stuck and the SIM card connector is able to shorten sizes of base portions of the terminal structure which include sizes of the first base portions of the plurality of the first terminals assembled in terminal slots which include the plurality of the first slots of the SIM card connector.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
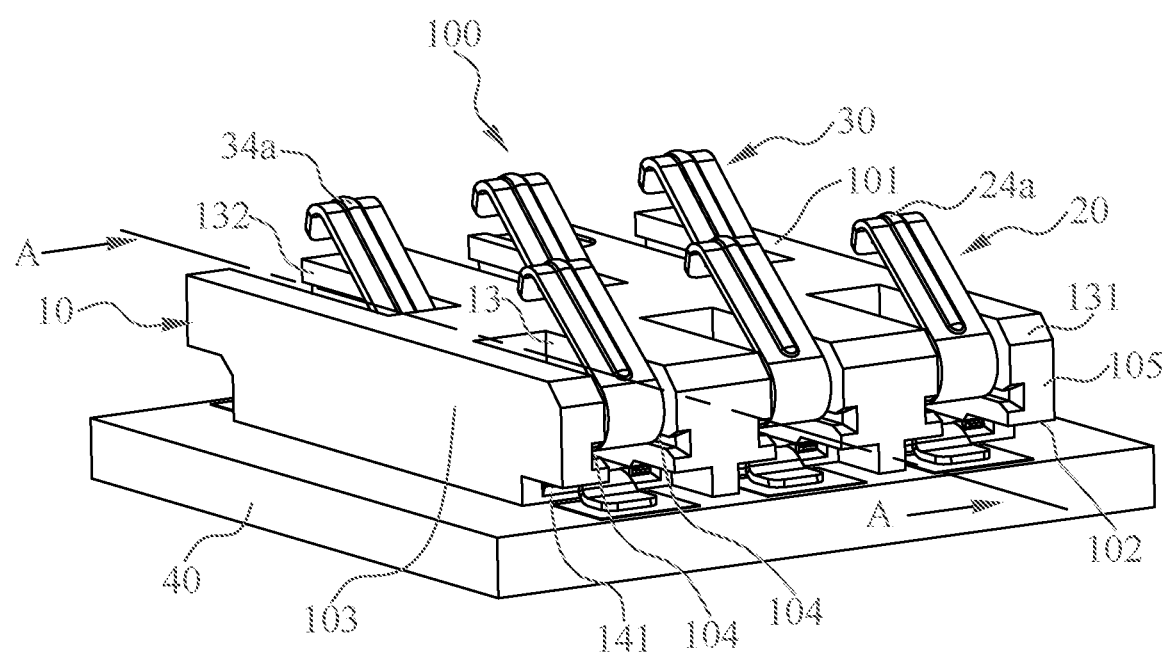
FIG. 1 is a perspective view of a SIM card connector in accordance with a preferred embodiment of the present invention.

Referring to FIG. 1 to FIG. 4, a SIM (Subscriber Identity Model) card connector 100 in accordance with a preferred embodiment of the present invention is shown. The SIM card connector 100 is adapted for being mounted on a circuit board 40. The SIM card connector 100 includes a cuboid insulating body 10, a plurality of first terminals 20 mounted to the insulating body 10 and arranged in a front row, and a plurality of second terminals 30 mounted to the insulating body 10 and arranged in a rear row. The plurality of second terminals 30 are located behind the plurality of the first terminals 20.

The insulating body 10 has a plurality of first slots 11 arranged at a front end of the insulating body 10 and connected to an external space, and a plurality of second slots 12 arranged at a rear end of the insulating body 10 and connected to the external space. The plurality of the first slots 11 and the plurality of the second slots 12 are oppositely disposed to the insulating body 10. The plurality of the first slots 11 are arranged in a front row, and the plurality of the second slots 12 are arranged in a rear row and located behind the plurality of the first slots 11. The insulating body 10 has a front surface 105, a rear surface 106 opposite to the front surface 105, a top surface 101 connected between tops of the front surface 105 and the rear surface 106, and a bottom surface 102 opposite to the top surface 101 and connected to bottoms of the front surface 105 and the rear surface 106.

Specifically, the plurality of the first slots 11 are recessed inward and towards a center of the insulating body 10 from an upper portion of the front surface 105 of the insulating body 10 and penetrating through a front of the top surface 101 of the insulating body 10. The plurality of the second slots 12 are recessed inward and towards the center of the insulating body 10 from an upper portion of the rear surface 106 of the insulating body 10 and penetrating through a rear of the top surface 101 of the insulating body 10. Each first slot 11 has a first peripheral wall 131 and a first bottom wall 141. The first peripheral wall 131 is U-shaped. Each first slot 11 is formed among the first peripheral wall 131 and the first bottom wall 141. Each second slot 12 has a second peripheral wall 132 and a second bottom wall 142. The second peripheral wall 132 is U-shaped. Each first slot 11 has a first opening 111 penetrating through the upper portion of the front surface 105 of the insulating body 10. The first opening 111 of each first slot 11 faces towards a frontward direction. Each second slot 12 has a second opening 121 penetrating through the upper portion of the rear surface 106 of the insulating body 10. The second opening 121 of each second slot 12 faces towards a rearward direction.

The plurality of the first terminals 20 are positioned in the insulating body 10. The plurality of the second terminals 30 are positioned in the insulating body 10. The plurality of the first terminals 20 are inserted into and assembled to the plurality of the first slots 11 from the front end of the insulating body 10, and the plurality of the second terminals 30 are inserted into and assembled to the plurality of the second slots 12 from the rear end of the insulating body 10. The plurality of the first terminals 20 are arranged in the front row. For a convenience of a description of the SIM card connector 100, a transition surface 103 connected between the top surface 101 and the bottom surface 102 of the insulating body 10 is defined as sides of the insulating body 10. The plurality of the first slots 11 and the second slots 12 are recessed inward and towards the center of the insulating body 10 from a front side and a rear side of the insulating body 10. The SIM card connector 100 is adapted for being docked with a docking element (not shown). The insulating body 10 of the SIM card connector 100 has two opposite ends. When the SIM card connector 100 is docked with the docking element, the rear end of the insulating body 10 is one end of the insulating body 10 where the docking element is inserted in advance, and the front end of the insulating body 10 is the other end of the insulating body 10 opposite to the rear end of the insulating body 10.

Each first terminal 20 has a first curved portion 201 positioned in the insulating body 10, a first soldering portion 22 connected with a lower end of the first curved portion 201 and extended outside of the insulating body 10 from a first junction position 107 which is connected between the front surface 105 and the bottom surface 102 of the insulating body 10, a second curved portion 202 connected with an upper end of the first curved portion 201, and a first contacting portion 24 slantwise extended towards the rear end of the insulating body 10 from an upper end of the second curved portion 202 and exposed outside from a second junction position 108 which is connected between the front surface 105 and the top surface 101 of the insulating body 10. The first contacting portion 24 of each first terminal 20 is exposed beyond the top surface 101 of the insulating body 10.

Referring to FIG. 1 to FIG. 4, in the preferred embodiment, each first terminal 20 has a first base portion 21 arranged in one first slot 11, the first soldering portion 22 connected with a lower end of the first base portion 21, and the first contacting portion 24 connected with an upper end of the first base portion 21. The first contacting portion 24 of each first terminal 20 slantwise extends upward and rearward from the upper end of the first base portion 21 and is exposed beyond the top surface 101 of the insulating body 10. The first soldering portion 22 of each first terminal 20 is exposed to the bottom surface 102 of the insulating body 10 and is partially exposed beneath the bottom surface 102 of the insulating body 10. The first contacting portion 24 of each first terminal 20 slantwise extends towards the rear end of the insulating body 10 from the upper end of the first base portion 21 of each first terminal 20.

Each second terminal 30 has a third curved portion 301 positioned in the insulating body 10, a second contacting portion 34 connected with an upper end of the third curved portion 301, a second soldering portion 32 connected with a lower end of the third curved portion 301 and extended outside of the insulating body 10 from a third junction position 109 which is connected between the rear surface 106 and the bottom surface 102 of the insulating body 10.

When a pressure is exerted upon the plurality of the first terminals 20 and the second terminals 30, a stress of the second curved portion 202 of each first terminal 20 is more than a stress of the third curved portion 301 of each second terminal 30, the stress of the third curved portion 301 of each second terminal 30 is more than a stress of the first curved portion 201 of each first terminal 20. The first curved portion 201 of each first terminal 20 is substantially bent as a U shape, the second curved portion 202 of each first terminal 20 is substantially bent as an arc shape, and the third curved portion 301 of each second terminal 30 is substantially bent as another U shape. Preferably, the first curved portion 201 of each first terminal 20 is bent as the U shape, the second curved portion 202 of each first terminal 20 is bent as the arc shape, and the third curved portion 301 of each second terminal 30 is bent as another U shape. A front of the first curved portion 201 of each first terminal 20 is opened freely, the second curved portion 202 of each first terminal 20 is arched frontward, and a rear of the third curved portion 301 of each second terminal 30 is opened freely.

Each second terminal 30 has a second base portion 31 arranged in one second slot 31, the second soldering portion 32 extended from a rear end of the second base portion 31, a third resilient portion 33 bent frontward and upward from a front end of the second base portion 31, and the second contacting portion 34 connected with an upper end of the third resilient portion 33. The second contacting portion 34 of each second terminal 30 is slantwise extended upward and rearward from the upper end of the third resilient portion 33 and is exposed beyond the top surface 101 of the insulating body 10. The second contacting portion 34 of each second terminal 30 is slantwise extended towards the rear end of the insulating body 10 from the upper end of the third resilient portion 33 of each second terminal 30. A tilted extension direction of the first contacting portion 24 of each first terminal 20 is nearly the same as a tilted extension direction of the second contacting portion 34 of each second terminal 30. Preferably, the tilted extension direction of the first contacting portion 24 of each first terminal 20 is the same as the tilted extension direction of the second contacting portion 34 of each second terminal 30. The first contacting portion 24 of each first terminal 20 and the second contacting portion 34 of each second terminal 30 are tilted towards the rear end of the insulating body 10. The second soldering portion 32 of each second terminal 30 is bent downward and is extended rearward from the rear end of the second base portion 31 of each second terminal 30. The second soldering portion 32 of each second terminal 30 is exposed beyond the bottom surface 102 of the insulating body 10. The third curved portion 301 of each second terminal 30 includes the second base portion 31 and the third resilient portion 33.

Referring to FIG. 1 to FIG. 4, in order to reduce a total volume of the SIM card connector 100, extending directions of the first contacting portions 24 of the plurality of the first terminals 20 and the second contacting portions 34 of the plurality of the second terminals 30 are the same at the time of the first contacting portions 24 of the plurality of the first terminals 20 and the second contacting portions 34 of the plurality of the second terminals 30 being inserted into the plurality of the first slots 11 and the plurality of the second slots 12 of the insulating body 10, and in order to avoid the first contacting portions 24 of the plurality of the first terminals 20 contacting with the first soldering portions 22 of the plurality of the first terminals 20 at the time of the plurality of the first terminals 20 being inserted into the insulating body 10, and in order to achieve an effect of shortening sizes of the first base portions 21 of the plurality of the first terminals 20 assembled in the plurality of the first slots 11, in this preferred embodiment, the first base portion 21 of each first terminal 20 has a first resilient portion 23 which is disposed to be bent to be U-shaped, a fastening portion 25 extended frontward from a lower end of the first resilient portion 23, a buffering portion 26 extended frontward from an upper end of the first resilient portion 23, and a second resilient portion 27 arranged between and connected between the first contacting portion 24 and the buffering portion 26. The first resilient portion 23 of each first terminal 20 is bent to be U-shaped seen from a side view, and is different from the first curved portion 201 of each first terminal 20 and the third curved portion 301 of each second terminal 30. The first curved portion 201 of each first terminal 20 includes the fastening portion 25, the first resilient portion 23 and the buffering portion 26. The second curved portion 202 of each first terminal 20 is the second resilient portion 27.

The second resilient portion 27 and the first resilient portion 23 of each terminal 20 are bent in opposite directions, so that each first terminal 20 is in a continuous bending shape. The first resilient portion 23 of each first terminal 20 has a mouth 231 penetrating through a front of each first terminal 20, so the mouth 231 of the first resilient portion 23 of each first terminal 20 faces frontward. The fastening portion 25 is connected with the first soldering portion 22 and one end of the first resilient portion 23. The buffering portion 26 is connected with the first contacting portion 24 by the second resilient portion 27, and the buffering portion 26 is connected with the other end of the first resilient portion 23. The buffering portion 26 is arranged parallel to and above the fastening portion 25 by the first resilient portion 23. The buffering portion 26 is located under and is adjacent to the first contacting portion 24.

The buffering portion 26 is parallel to and is located above the fastening portion 25 by the first resilient portion 23 for achieving the effect of shortening the sizes of the first base portions 21 of the plurality of the first terminals 20 assembled in the plurality of the first slots 11, and the buffering portion 26 is parallel to and is located above the fastening portion 25 for making an extending direction of the first contacting portion 24 of each first terminal 20 and an extending direction of the second contacting portion 34 of each second terminal 30 be able to keep consistent. The first base portion 21 further includes the second resilient portion 27 bent frontward and upward from a front end of the buffering portion 26. The second resilient portion 27 is arranged to connect with the first contacting portion 24 and make the first contacting portion 24 tilted upward and rearward, and then bent downward and rearward along a free end of the second resilient portion 27.

And an upper surface of the first contacting portion 24 protrudes outward to form a first convex portion 24a, and an upper surface of the second contacting portion 34 protrudes upward to form a second convex portion 34a to enhance a stress intensity of the first contacting portion 24 and the second contacting portion 34 at the time of the SIM card connector 100 contacting with the docking element and to reduce an abrasion on the upper surface of the first contacting portion 24 and the upper surface of the second contacting portion 34 at the time of the SIM card connector 100 contacting with the docking element. The bottom surface 102 of the insulating body 10 is placed on a top surface of the circuit board 40. The first soldering portions 22 of the plurality of the first terminals 20 and the second soldering portions 32 of the plurality of the second terminals 30 are soldered to the circuit board 40 placed under the bottom surface 102 of the insulating body 10.

Referring to FIG. 1 to FIG. 4, in the preferred embodiment, when the first contacting portions 24 of the plurality of the first terminals 20 are inserted into the docking element, in order to ensure that the buffering portion 26 avoids being pressed downward to generate a displacement and being deformed permanently under an action of the first contacting portions 24 of the plurality of the first terminals 20 being pressed downward by a pressing force, each side of the buffering portion 26 extends outward to form a flank 26a, specifically, two opposite side surfaces of the buffering portion 26 of each first terminal 20 adjacent to two side walls of the one first slot 11 protrude oppositely to form two flanks 26a. The flanks 26a of two sides of the buffering portion 26 are aligned and symmetrical.

The two flanks 26a are symmetrically extended outward from two sides of the buffering portion 26 of each first terminal 20 and are in alignment with each other. The two flanks 26a project beyond the two opposite side surfaces of the buffering portion 26 of each first terminal 20. The two flanks 26a are close to the one end of the first resilient portion 23. Each side wall of each first slot 11 has a limiting slot 11a. The limiting slots 11a of two side walls of each first slot 11 are recessed oppositely. The limiting slots 11a of the two side walls of each first slot 11 are symmetrical. Each side wall of each first slot 11 is recessed inward to form a limiting slot 11a. Middles of two inner surfaces of two parallel side walls of each first slot 11 are recessed oppositely to form two limiting slots 11a corresponding to the two flanks 26a of one first terminal 20, respectively. The flanks 26a of the two sides of the buffering portion 26 are close to the first resilient portion 23 and are cooperated to be assembled between spaces 104 of the limiting slots 11a of the two side walls of the one first slot 11 to buffer a stress force of the first contacting portion 24 of each first terminal 20.

The two limiting slots 11a of each first slot 11 are parallel to each other. The two limiting slots 11a of each first slot 11 extend frontward and towards a direction of the first opening 111 of each first slot 11, and the two limiting slots 11a of each first slot 11 are parallel to each other. The two limiting slots 11a of each first slot 11 are symmetrical to each other. The two flanks 26a of each first terminal 20 are cooperated with and assembled in the two limiting slots 11a of one first slot 11. Top surfaces and bottom surfaces of the two flanks 26a are without abutting against top walls and bottom walls of the two limiting slots 11a to make each flank 26a limited between a top wall and a bottom wall of one limiting slot 11a to move upward and downward. The two flanks 26a are limited between the two limiting slots 11a. When the first contacting portion 24 of each first terminal 20 is pressed downward, the first contacting portion 24 of each first terminal 20 suffers the relatively smaller stress force, and then each first terminal 20 is prevented from being deformed permanently on account of each first terminal 20 suffering the excessive stress force.

Figure 2:
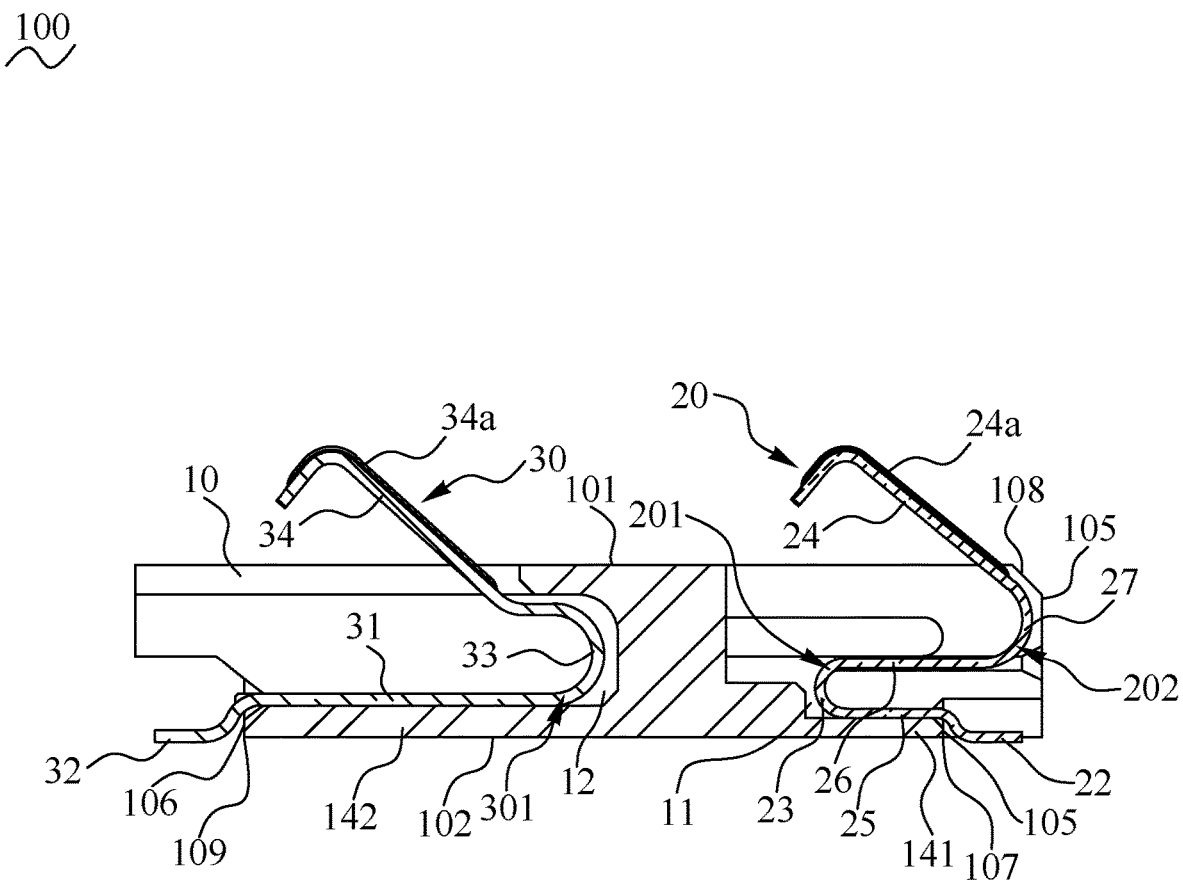
FIG. 2 is a sectional view of the SIM card connector along a line A-A of FIG. 1.
Figure 3:
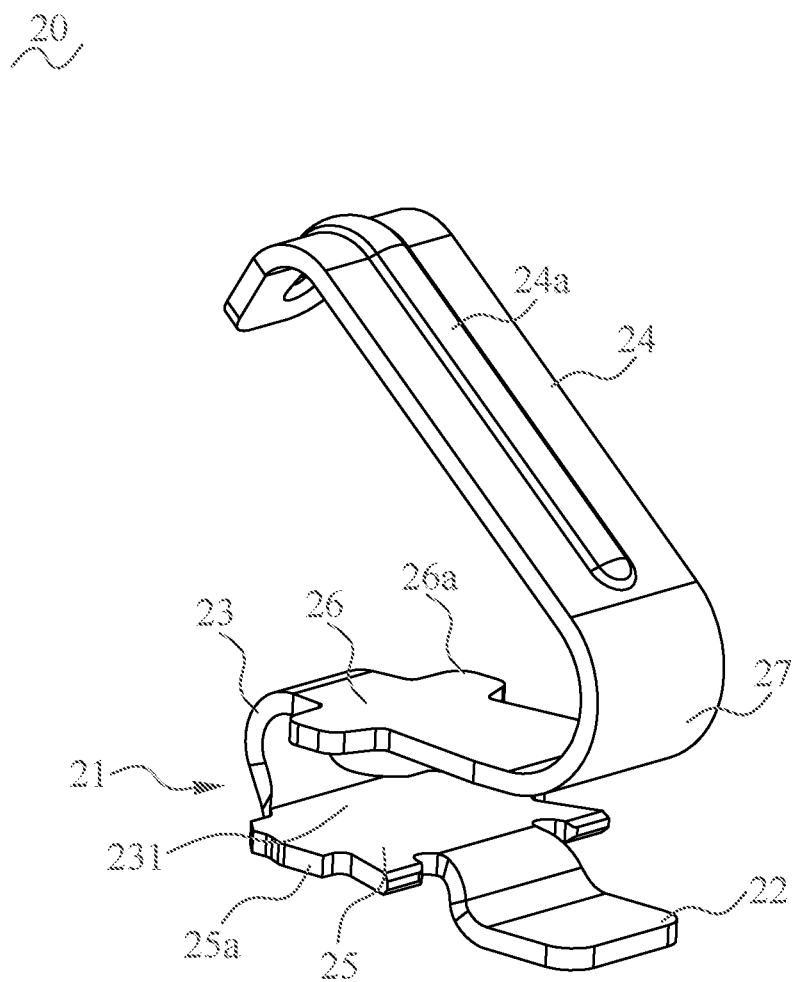
FIG. 3 is a perspective view of a first terminal of the SIM card connector in accordance with the present invention.
Figure 4:
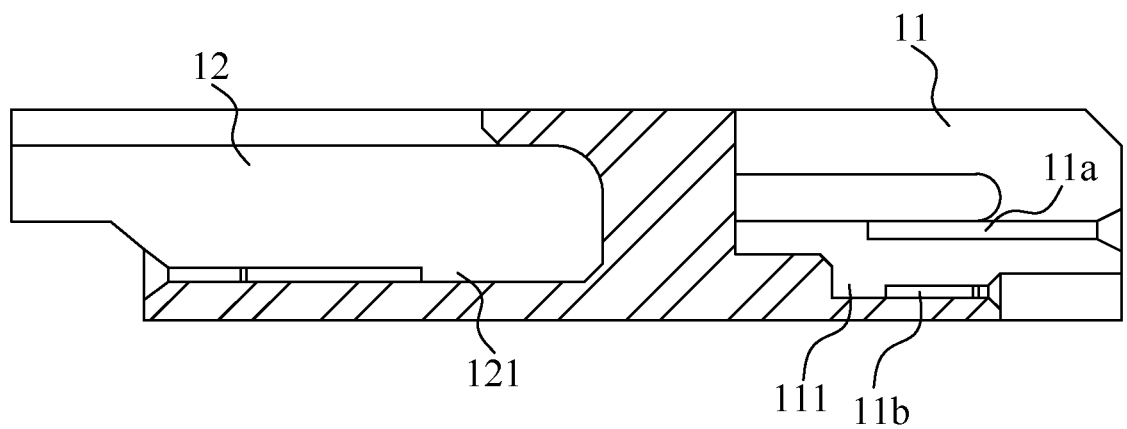
FIG. 4 is a sectional view of an insulating body of the SIM card connector along the line A-A of FIG. 1.
Figure 5:
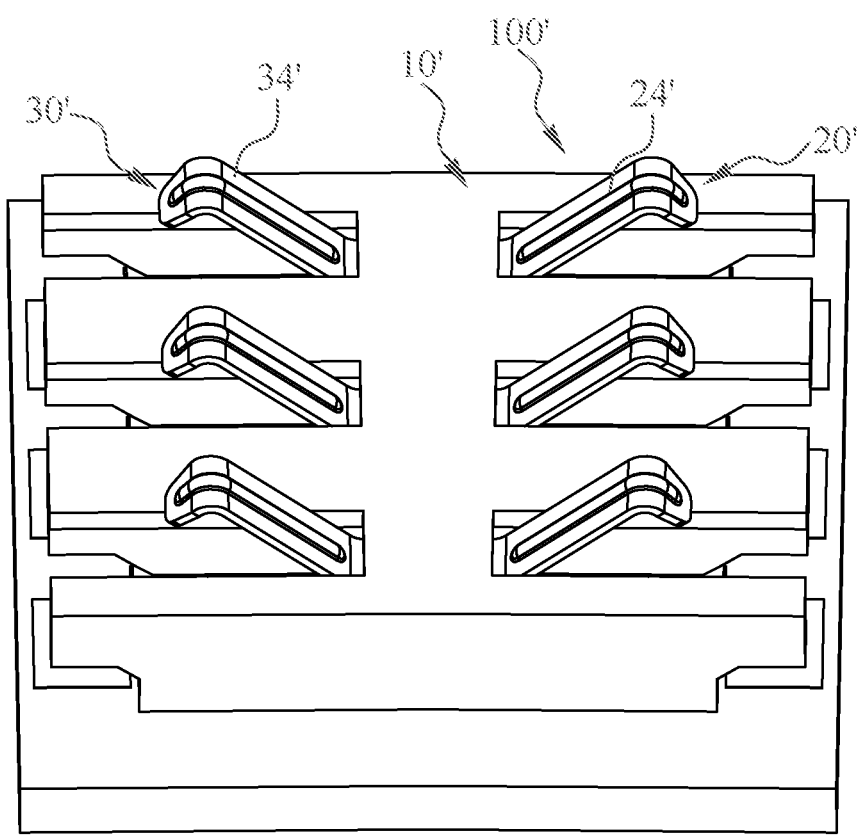
FIG. 5 is a perspective view of a conventional SIM card connector in a prior art.
Figure 6:
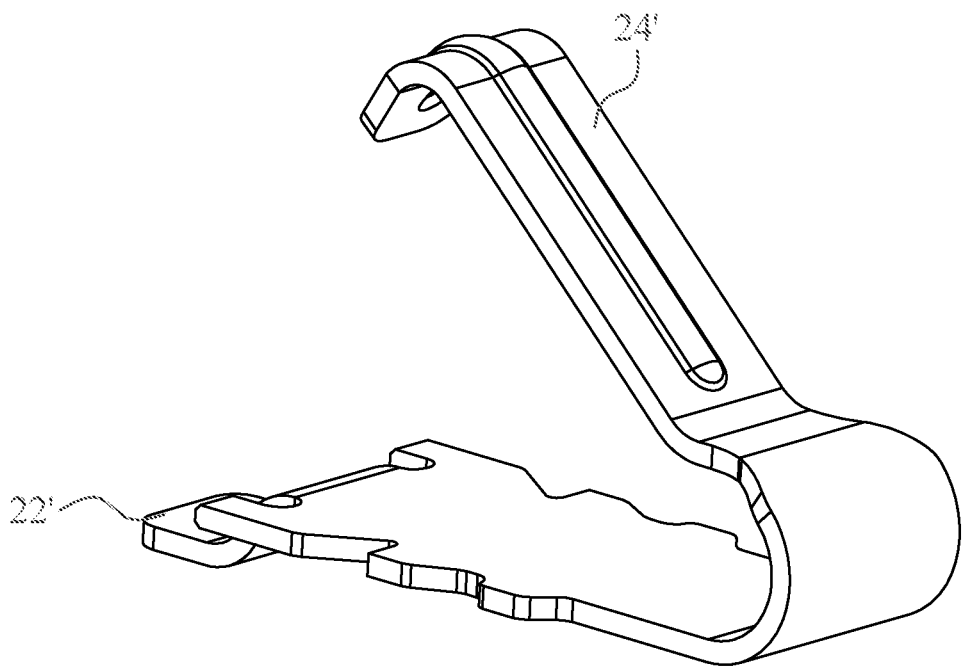
FIG. 6 is a perspective view of a row of first terminals of the conventional SIM card connector of FIG. 5.

Referring to FIG. 2 and FIG. 4, in the preferred embodiment, in order to make the plurality of the first terminals 20 be able to provide a better retention force at the time of the plurality of the first terminals 20 being assembled in the plurality of the first slots 11, and in order to prevent the plurality of the first terminals 20 from generating the displacement at the time of the docking element being inserted into or withdrawn from the SIM card connector 100 to affect a usage function of the SIM card connector 100, two sides of the fastening portion 25 of each first terminal 20 have two interfering teeth 25a. The two interfering teeth 25a are disposed symmetrically and are extended levelly. The two interfering teeth 25a are in alignment with each other. The two interfering teeth 25a are oppositely extended and project beyond two opposite side surfaces of the fastening portion 25 of each first terminal 20. Lower portions of the two inner surfaces of the two side walls of each first slot 11 are recessed oppositely to form two buckling slots 11b corresponding to the two interfering teeth 25a of the one first terminal 20. The two buckling slots 11b of each first slot 11 extend frontward and towards the direction of the first opening 111 of each first slot 11, and the two buckling slots 11b of each first slot 11 are parallel to each other. The two buckling slots 11b of each first slot 11 are located under and parallel with the two limiting slots 11a of each first slot 11. The two interfering teeth 25a of each first terminal 20 are buckled in the two buckling slots 11b of the one first slot 11. The two interfering teeth 25a of each first terminal 20 abut against top walls and bottom walls of the two buckling slots 11b of the one first slot 11 to make the plurality of the first terminals 20 stably inserted into and assembled to the plurality of the first slots 11 to form an interference cooperation between the plurality of the first terminals 20 and the plurality of the first slots 11, so that the plurality of the first terminals 20 are hardly loosened from the plurality of the first slots 11 of the insulating body 10.

As described above, the two flanks 26a of each first terminal 20 are cooperated with and assembled in the two limiting slots 11a of the one first slot 11, and the two interfering teeth 25a of each first terminal 20 are buckled in the two buckling slots 11b of the one first slot 11, the two interfering teeth 25a of each first terminal 20 abut against the top walls and the bottom walls of the two buckling slots 11b of the one first slot 11 to make the plurality of the first terminals 20 stably inserted into and assembled to the plurality of the first slots 11 to form the interference cooperation between the plurality of the first terminals 20 and the plurality of the first slots 11, so that the plurality of the first terminals 20 are hardly loosened from the plurality of the first slots 11 of the insulating body 10. As a result, the SIM card connector 100 effectively prevents a phenomenon of a terminal structure of the SIM card connector 100 which include the plurality of the first terminals 20 and second terminals 30 being stuck and is able to shorten sizes of base portions of the terminal structure which include the sizes of the first base portions 21 of the plurality of the first terminals 20 assembled in terminal slots which include the plurality of the first slots 11 of the SIM card connector 100.

What is claimed is:

1. A SIM (Subscriber Identity Model) card connector, comprising:

an insulating body having a plurality of first slots arranged at a front end of the insulating body and connected to an external space, and a plurality of second slots arranged at a rear end of the insulating body and connected to the external space, the plurality of the first slots being arranged in a front row, and the plurality of the second slots being arranged in a rear row and located behind the plurality of the first slots, each side wall of each first slot having a limiting slot, the limiting slots of two side walls of each first slot being recessed oppositely, the limiting slots of the two side walls of each first slot being symmetrical;

a plurality of first terminals inserted into the plurality of the first slots from the front end of the insulating body, the plurality of the first terminals being arranged in a front row, each first terminal having a first base portion arranged in one first slot, a first soldering portion connected with a lower end of the first base portion, and a first contacting portion connected with an upper end of the first base portion, the first contacting portion of each first terminal slantwise extending towards the rear end of the insulating body from the upper end of the first base portion of each first terminal and being exposed beyond a top surface of the insulating body, the first soldering portion of each first terminal being exposed to a bottom surface of the insulating body, the first base portion of each first terminal having a first resilient portion which is bent to be U-shaped, a fastening portion connected with the first soldering portion and one end of the first resilient portion, and a buffering portion connected with the other end of the first resilient portion, the buffering portion being adjacent to the first contacting portion, the buffering portion being arranged parallel to and above the fastening portion by the first resilient portion, each side of the buffering portion extending outward to form a flank, the flanks of two sides of the buffering portion being aligned and symmetrical, the flanks of the two sides of the buffering portion being close to the first resilient portion and being cooperated to be assembled between spaces of the limiting slots of the two side walls of the one first slot to buffer a stress force of the first contacting portion of each first terminal; and a plurality of second terminals inserted into the plurality of the second slots from the rear end of the insulating body and arranged in a rear row, the plurality of the second terminals being located behind the plurality of the first terminals, each second terminal having a second contacting portion slantwise extended towards the rear end of the insulating body and exposed beyond the top surface of the insulating body, a tilted extension direction of the first contacting portion of each first terminal being the same as a tilted extension direction of the second contacting portion of each second terminal.

2. The SIM card connector as claimed in claim 1, wherein the first base portion of each first terminal has a second resilient portion arranged between and connected between the first contacting portion and the buffering portion, the second resilient portion and the first resilient portion of each first terminal are bent in opposite directions, so that each first terminal is in a continuous bending shape.

3. The SIM card connector as claimed in claim 1, wherein middles of two inner surfaces of the two parallel side walls of each first slot are recessed oppositely to form the two limiting slots, each first slot has a first opening penetrating through an upper portion of a front surface of the insulating body, the two limiting slots of each first slot extend frontward and towards a direction of the first opening of each first slot, and the two limiting slots of each first slot are parallel to each other, the two flanks of each first terminal are cooperated with and assembled in the two limiting slots of one first slot, top surfaces and bottom surfaces of the two flanks are without abutting against top walls and bottom walls of the two limiting slots to make each flank limited between a top wall and a bottom wall of one limiting slot to move upward and downward.

4. The SIM card connector as claimed in claim 1, wherein two sides of the fastening portion of each first terminal have two interfering teeth disposed symmetrically, the two interfering teeth are oppositely extended and project beyond two opposite side surfaces of the fastening portion of each first terminal, each first slot has a first opening penetrating through an upper portion of a front surface of the insulating body, lower portions of two inner surfaces of the two side walls of each first slot are recessed oppositely to form two buckling slots corresponding to the two interfering teeth of one first terminal, the two buckling slots of each first slot extend frontward and towards a direction of the first opening of each first slot, and the two buckling slots of each first slot are parallel to each other, the two buckling slots of each first slot are located under and parallel with the two limiting slots of each first slot, the two interfering teeth of each first terminal are buckled in the two buckling slots of the one first slot, the two interfering teeth of each first terminal abut against top walls and bottom walls of the two buckling slots of the one first slot.

5. The SIM card connector as claimed in claim 1, wherein each second terminal has a second base portion arranged in one second slot, a second soldering portion extended from a rear end of the second base portion, a third resilient portion bent frontward and upward from a front end of the second base portion, and the second contacting portion connected with an upper end of the third resilient portion, the second contacting portion of each second terminal is slantwise extended upward and rearward from the upper end of the third resilient portion and is exposed beyond the top surface of the insulating body.

6. The SIM card connector as claimed in claim 1, wherein the plurality of the first slots are recessed inward and towards a center of the insulating body from an upper portion of a front surface of the insulating body and penetrating through a front of the top surface of the insulating body.

7. The SIM card connector as claimed in claim 1, wherein the plurality of the second slots are recessed inward and towards a center of the insulating body from an upper portion of a rear surface of the insulating body and penetrating through a rear of the top surface of the insulating body.

8. A SIM (Subscriber Identity Model) card connector, comprising:
an insulating body having a front surface, a rear surface opposite to the front surface, a top surface connected between tops of the front surface and the rear surface, and a bottom surface opposite to the top surface and connected to bottoms of the front surface and the rear surface;
a plurality of first terminals positioned in the insulating body, each first terminal having a first curved portion positioned in the insulating body, a first soldering portion connected with a lower end of the first curved portion and extended outside of the insulating body from a first junction position which is connected between the front surface and the bottom surface of the insulating body, a second curved portion connected with an upper end of the first curved portion, and a first contacting portion slantwise extended towards a rear end of the insulating body from an upper end of the second curved portion and exposed outside from a second junction position which is connected between the front surface and the top surface of the insulating body, the first contacting portion of each first terminal being exposed beyond the top surface of the insulating body; and
a plurality of second terminals positioned in the insulating body, the plurality of the second terminals being located behind the plurality of the first terminals, each second terminal having a third curved portion positioned in the insulating body, a second contacting portion connected with an upper end of the third curved portion, and a second soldering portion connected with a lower end of the third curved portion and extended outside of the insulating body from a third junction position which is connected between the rear surface and the bottom surface of the insulating body, the second contacting portion of each second terminal being slantwise extended towards the rear end of the insulating body and being exposed beyond the top surface of the insulating body;
wherein when a pressure is exerted upon the plurality of the first terminals and the second terminals, a stress of the second curved portion of each first terminal is more than a stress of the third curved portion of each second terminal, the stress of the third curved portion of each second terminal is more than a stress of the first curved portion of each first terminal.

9. The SIM card connector as claimed in claim 8, wherein the first curved portion of each first terminal is bent as a U shape, the second curved portion of each first terminal is bent as an arc shape, and the third curved portion of each second terminal is bent as another U shape.

10. The SIM card connector as claimed in claim 9, wherein a front of the first curved portion of each first terminal is opened freely, the second curved portion of each first terminal is arched frontward, and a rear of the third curved portion of each second terminal is opened freely.

11. The SIM card connector as claimed in claim 8, wherein each first terminal has a first base portion, the first base portion of each first terminal has a first resilient portion, a fastening portion extended frontward from a lower end of the first resilient portion, and a buffering portion extended frontward from an upper end of the first resilient portion, the first curved portion of each first terminal includes the fastening portion, the first resilient portion and the buffering portion.

12. The SIM card connector as claimed in claim 11, wherein the first base portion of each first terminal has a second resilient portion arranged between and connected between the first contacting portion and the buffering portion, the second curved portion of each first terminal is the second resilient portion.

13. The SIM card connector as claimed in claim 12, wherein each second terminal has a second base portion, and a third resilient portion bent frontward and upward from a front end of the second base portion, the third curved portion of each second terminal includes the second base portion and the third resilient portion.

14. A SIM (Subscriber Identity Model) card connector, comprising:

an insulating body having a plurality of first slots arranged at a front end of the insulating body, and a plurality of second slots arranged at a rear end of the insulating body, the plurality of the second slots being located behind the plurality of the first slots, middles of two inner surfaces of two side walls of each first slot being recessed oppositely to form two limiting slots, lower portions of the two inner surfaces of the two side walls of each first slot being recessed oppositely to form two buckling slots;

a plurality of first terminals inserted into the plurality of the first slots from the front end of the insulating body, the plurality of the first terminals being arranged in a front row, each first terminal having a first base portion arranged in one first slot, a first soldering portion connected with a lower end of the first base portion, and a first contacting portion connected with an upper end of the first base portion, the first contacting portion of each first terminal slantwise extending towards the rear end of the insulating body from the upper end of the first base portion of each first terminal and being exposed beyond a top surface of the insulating body, the first soldering portion of each first terminal being exposed to a bottom surface of the insulating body, the first base portion of each first terminal having a first resilient portion which is bent to be U-shaped, a fastening portion connected with the first soldering portion and one end of the first resilient portion, a buffering portion connected with the other end of the first resilient portion, and a second resilient portion arranged between and connected between the first contacting portion and the buffering portion, the second resilient portion and the first resilient portion being bent in opposite directions, the buffering portion being adjacent to the first contacting portion, the buffering portion being arranged parallel to and above the fastening portion by the first resilient portion, two opposite side surfaces of the buffering portion of each first terminal adjacent to two side walls of the one first slot protruding oppositely to form two flanks, the two flanks of each first terminal being assembled in the two limiting slots of one first slot, top surfaces and bottom surfaces of the two flanks being without abutting against top walls and bottom walls of the two limiting slots to make each flank limited between a top wall and a bottom wall of one limiting slot to move upward and downward; and a plurality of second terminals inserted into the plurality of the second slots from the rear end of the insulating body and arranged in a rear row, the plurality of the second terminals being located behind the plurality of the first terminals, each second terminal having a second contacting portion slantwise extended towards the rear end of the insulating body and exposed beyond the top surface of the insulating body.

* * * * *